United States Patent [19]
Crater et al.

[11] Patent Number: 5,146,588
[45] Date of Patent: Sep. 8, 1992

[54] REDUNDANCY ACCUMULATOR FOR DISK DRIVE ARRAY MEMORY

[75] Inventors: Michael R. Crater, Arvada; David P. Haldeman, Broomfield, both of Colo.

[73] Assignee: Storage Technology Corporation, Louisville, Colo.

[21] Appl. No.: 617,574

[22] Filed: Nov. 26, 1990

[51] Int. Cl.⁵ .............................................. G06F 11/08
[52] U.S. Cl. .................................. 395/575; 371/10.1; 371/37.1; 371/49.1
[58] Field of Search ................ 395/575; 364/200, 900, 364/247.1; 371/10.1, 37.1, 49.2, 49.1

[56] References Cited

U.S. PATENT DOCUMENTS 4,872,106 10/1989 Slater .................................. 364/200
5,077,736 12/1991 Dunphy, Jr. et al. ............. 371/10.1

OTHER PUBLICATIONS

Chen et al., Two Papers on Raids, Computer Science Division, UC Berkeley Dec. 1988.

*Primary Examiner*—Jerry Smith
*Assistant Examiner*—Henry C. Lebowitz
*Attorney, Agent, or Firm*—Dorr, Carson, Sloan & Peterson

[57] ABSTRACT

The data storage subsystem of the present invention uses a large plurality of small form factor disk drives to implement an inexpensive, high performance, high reliability disk drive memory that emulates the format and capability of large form factor disk drives. The data transmitted by the associated computer system is used to generate redundancy information which is written with the data across N+M disk drives in a redundancy group in the data storage subsystem. To clear the redundancy accumulator memory, an associated pointer memory is used to indicate the ones of the redundancy accumulator memory byte positions that were used in the previous redundancy calculation. As data is received from the computer system, the pointer memory is checked to determine whether this next byte position need be reset to erase the previously stored redundancy calculation residue. If not, the data is simply stored therein.

16 Claims, 4 Drawing Sheets

REDUNDANCY ACCUMULATOR FOR DISK DRIVE ARRAY MEMORY

FIELD OF THE INVENTION

This invention relates to data storage subsystems and, in particular, to an improved redundancy accumulator circuit for a disk drive array memory.

PROBLEM

It is a problem in the field of computer systems to provide an inexpensive, high performance, high reliability memory that has backup capability. An alternative to the large form factor disk drives for storing data is the use of a multiplicity of small form factor disk drives interconnected in an array. The plurality of disk drives are interconnectable to form redundancy groups of N+M parallel connected disk drives to store data thereon. The N+M disk drives are used to store the N segments of data plus M redundancy segments. In addition, a pool of backup disk drives is maintained to automatically substitute a replacement disk drive for a disk drive in a redundancy group that fails during operation.

The pool of backup disk drives provides high reliability at low cost. Each disk drive in the disk drive array is designed so that it can detect a failure in its operation, which allows the redundancy segments to be used for error correction of a plurality of failed disk drives. Identification of the failed disk drives provides information on the position of the error in the code word and the redundancy data provides information to correct the error itself. Once a failed disk drive is identified, a backup disk drive from the shared pool of backup disk drives is automatically switched in place of the failed disk drive. Control circuitry reconstructs the data stored on the failed disk drive, using the remaining N+M-1 segments of data and redundancy in the redundancy group. The reconstructed data is then written onto the substitute disk drive. The use of backup disk drives increases the reliability of the N+M parallel disk drive architecture while the use of a shared pool of backup disk drives minimizes the cost of providing the improved reliability.

A difficulty with this architecture is that redundancy information must be generated quickly as the data is being received from the associated computer system. Once the redundancy segments are produced and stored on disk drives in the redundancy group, the redundancy accumulator must be cleared prior to receiving additional data from the computer system. In a typical disk drive array memory, the redundancy accumulator memory can be 64 K bytes in size and to zero all the entries in this redundancy accumulator memory requires a significant amount of time. This can cause the disk drive array memory to be unavailable to the computer system until this memory is reset. If a random access memory is used to implement the redundancy accumulator, each data position in the memory must be addressed seriatim and set to zero before any data can be accepted from the computer system. The resetting of the accumulator memory is critical because any residue remaining therein will cause an erroneous calculation of the redundancy data for subsequently received data. It is also desirable to avoid overwriting the redundancy data until after it has been securely written to the disk drive array in the event that the first attempt fails.

SOLUTION

The above described problems are solved and a technical advance achieved in the field by the redundancy accumulator for a disk drive array memory of the present invention. The data storage subsystem of the present invention uses a large plurality of small form factor disk drives to implement an inexpensive, high performance, high reliability disk drive memory that emulates the format and capability of large form factor disk drives. In operation, the data transmitted by the associated computer system is used to generate redundancy information. The data and redundancy information is written across N+M disk drives in a redundancy group in the data storage subsystem. In response to the associated computer system writing data to the data storage subsystem, a circuit in the data storage subsystem control unit generates M redundancy segments that represent redundancy data that can be used to reconstruct up to M of the N segments of the data if up to M data segments are inadvertently lost due to disk drive failures. A disk drive manager in the data storage subsystem selects N+M disk drives from the plurality of disk drives in the data storage subsystem to function as a redundancy group on which the data file and its associated redundancy segments are stored.

Once the redundancy data is stored on the disk drives of the data storage subsystem, the redundancy accumulator memory must be cleared before it can be used again. This is accomplished by using an associated pointer memory that indicates which of the redundancy accumulator memory byte positions were used in the previous redundancy calculation. In this manner, it is known which memory positions need not be reset. As data is received from the computer system, the pointer memory is checked to determine whether this next byte position need be reset to erase the previously stored redundancy calculation residue. If not, the data is simply stored therein. If a reset is necessary, it can be done prior to storing the received data and interleaved with the data reception from the associated computer system.

In this manner, unnecessary memory reset operations are avoided, since a record is maintained in the pointer memory of the segments of the redundancy accumulator memory that are used in the last previous redundancy calculation. This eliminates the delay in data storage caused by the need in previous systems to reset all of the redundancy accumulator memory. The data in the redundancy accumulator is preserved, should it be needed for a retry operation, because only the pointer memory is modified when redundancy data is read from the redundancy accumulator.

DETAILED DESCRIPTION OF THE DRAWING

The data storage subsystem of the present invention uses a large plurality of small form factor disk drives to implement an inexpensive, high performance, high reliability disk drive memory that emulates the format and capability of large form factor disk drives. In operation, the data transmitted by the associated computer system is used to generate redundancy information. The data and redundancy information is written across N+M disk drives in the data storage subsystem. In response to the associated central processing unit writing data to the data storage subsystem, a control module in the data storage subsystem generates M redundancy segments that represent redundancy data that can be used to reconstruct up to M of the N segments of the data if up to M segments of redundancy are inadvertently lost due to a disk drive failure. A cluster control in the data storage subsystem selects N+M disk drives from the plurality of disk drives in the data storage subsystem to function as a redundancy group on which the data file and its associated redundancy segments are stored.

Once the redundancy data is stored on the disk drives of the redundancy group, the redundancy accumulator memory must be cleared before the accumulator memory can be used for a subsequent transfer. This is accomplished by using an associated pointer memory which indicates which ones of the redundancy accumulator memory byte positions were used in the previous redundancy calculation. In this manner, it is known which memory positions need not be reset. Therefore, as data is received from the computer system, the redundancy accumulator memory is checked to determine whether this next byte position need be reset to erase the previously stored redundancy calculation residue. If not, the data is simply stored therein. If a reset is necessary, it can be done prior to storing the received data and interleaved with the data reception from the associated computer system.

Data Storage Subsystem Architecture

Figure 1:
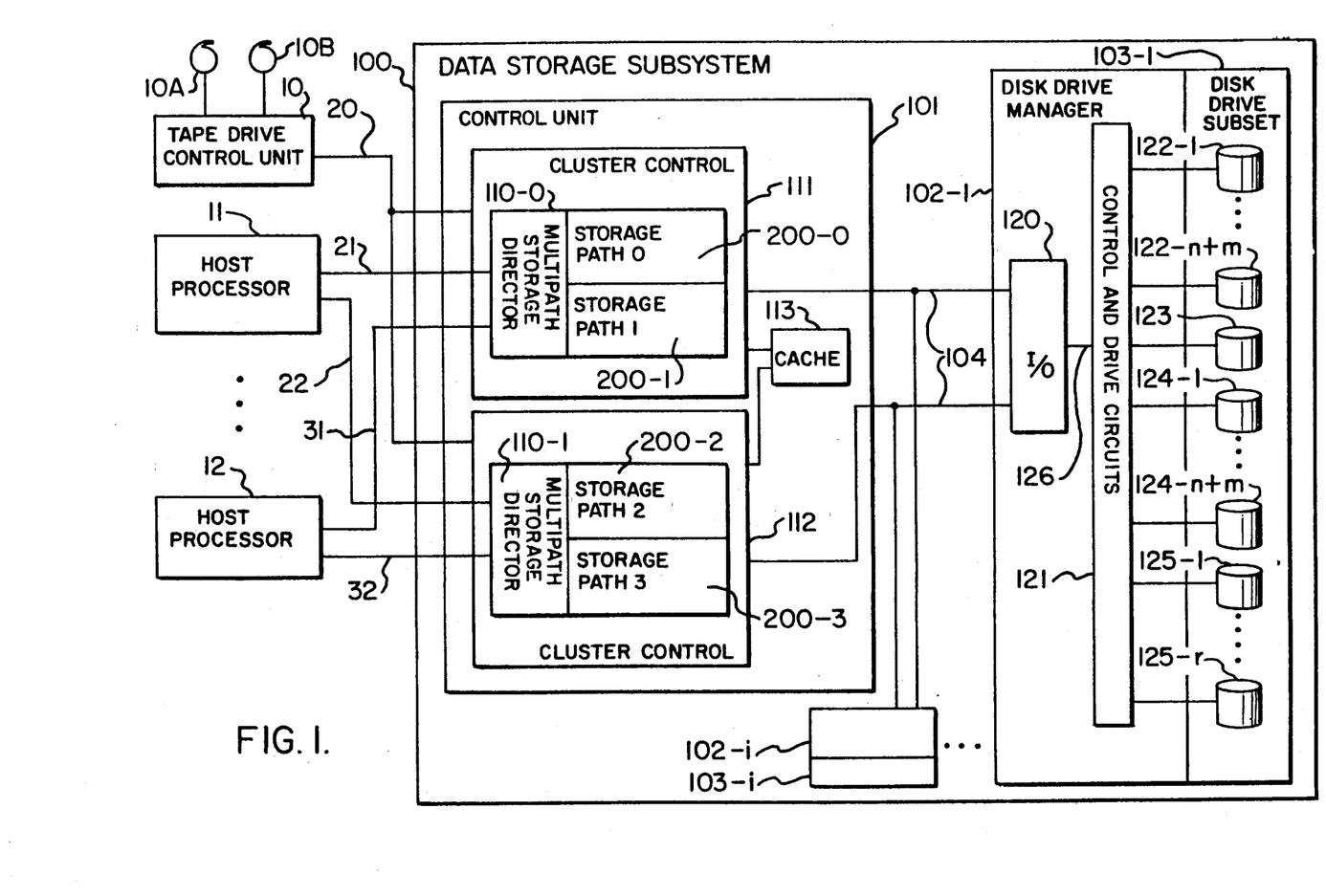
FIG. 1 illustrates, in block diagram form, the architecture of the data storage subsystem.

FIG. 1 illustrates in block diagram form the architecture of the preferred embodiment of the disk drive array data storage subsystem 100. The disk drive array data storage subsystem 100 appears to the associated host processors 11-12 to be a collection of large form factor disk drives with their associated storage control, since the architecture of disk drive array data storage subsystem 100 is transparent to the associated host processors 11-12. This disk drive array data storage subsystem 100 includes a plurality of disk drives (ex 122-1 to 125-r) located in a plurality of disk drive subsets 103-1 to 103-i. The disk drives 122-1 to 125-r are significantly less expensive, even while providing disk drives to store redundancy information and providing disk drives for backup purposes, than the typical 14 inch form factor disk drive with an associated backup disk drive. The plurality of disk drives 122-1 to 125-r are typically the commodity hard disk drives in the 5¼ inch form factor, although they can also be disk drive arrays or disk drives of other than a 5¼ inch form factor.

The architecture illustrated in FIG. 1 is that of a plurality of host processors 11-12 interconnected via the respective plurality of data channels 21, 22-31, 32, respectively to a data storage subsystem 100 that provides the backend data storage capacity for the host processors 11-12. This basic configuration is well known in the data processing art. The data storage subsystem 100 includes a control unit 101 that serves to interconnect the subsets of disk drives 103-1 to 103-i and their associated drive managers 102-1 to 102-i with the data channels 21-22, 31-32 that interconnect data storage subsystem 100 with the plurality of host processors 11, 12.

Control unit 101 includes typically two cluster controls 111, 112 for redundancy purposes. Within a cluster control 111 the multipath storage director 110-0 provides a hardware interface to interconnect data channels 21, 31 to cluster control 111 contained in control unit 101. In this respect, the multipath storage director 110-0 provides a hardware interface to the associated data channels 21, 31 and provides a multiplex function to enable any attached data channel ex-21 from any host processor ex-11 to interconnect to a selected cluster control 111 within control unit 101. The cluster control 111 itself provides a pair of storage paths 200-0, 200-1 which function as an interface to a plurality of optical fiber backend channels 104. In addition, the cluster control 111 includes a data compression function as well as a data routing function that enables cluster control 111 to direct the transfer of data between a selected data channel 21 and cache memory 113, and between cache memory 113 and one of the connected optical fiber backend channels 104. Control unit 101 provides the major data storage subsystem control functions that include the creation and regulation of data redundancy groups, reconstruction of data for a failed disk drive, switching a spare disk drive in place of a failed disk drive, data redundancy generation, logical device space management, and virtual to logical device mapping as is known in the field of disk drive array data storage subsystems.

Disk drive manager 102-1 interconnects the plurality of commodity disk drives 122-1 to 125-r included in disk drive subset 103-1 with the plurality of optical fiber backend channels 104. Disk drive manager 102-1 includes an input/output circuit 120 that provides a hardware interface to interconnect the optical fiber backend channels 104 with the data paths 126 that serve control and drive circuits 121. Control and drive circuits 121 receive the data on conductors 126 from input/output circuit 120 and convert the form and format of these signals as required by the associated commodity disk drives in disk drive subset 103-1 In addition, control and drive circuits 121 provide a control signalling interface to transfer signals between the disk drive subset 103-1 and control unit 101.

The data that is written onto the disk drives in disk drive subset 103-1 consists of data that is transmitted from an associated host processor 11 over data channel 21 to one of cluster controls 111, 112 in control unit 101. The data is written into, for example, cluster control 111 which stores the data in cache 113. Cluster control 111 stores N physical tracks of data in cache 113 and then generates M redundancy segments for error correction purposes. Cluster control 111 then selects a subset of disk drives (122-1 to 122-n+m) to form a redundancy group to store the received data. Cluster control 111 selects an empty logical track, consisting of N+M physical tracks, in the selected redundancy group. Each of the N physical tracks of the data are written onto one of N disk drives in the selected data redundancy group. An additional M disk drives are used in the redundancy group to store the M redundancy segments. The M redundancy segments include error correction characters and data that can be used to verify the integrity of the N physical tracks that are stored on the N disk drives as well as to reconstruct one or more of the N physical tracks of the data if that physical track were lost due to a failure of the disk drive on which that physical track is stored.

Thus, data storage subsystem 100 can emulate one or more large form factor disk drives (ex—an IBM 3380 K type of disk drive) using a plurality of smaller form factor disk drives while providing a high reliability capability by writing the data across a plurality of the smaller form factor disk drives. A reliability improvement is also obtained by providing a pool of R backup disk drives (125-1 to 125-r) that are switchably interconnectable in place of a failed disk drive. Data reconstruction is accomplished by the use of the M redundancy segments, so that the data stored on the remaining functioning disk drives combined with the redundancy information stored in the redundancy segments can be used by control software and hardware in control unit 101 to reconstruct the data lost when one or more of the plurality of disk drives in the redundancy group fails (122-1 to 122-n+m). This arrangement provides a reliability capability similar to that obtained by disk shadowing arrangements at a significantly reduced cost over such an arrangement.

Control Unit

Figure 2:
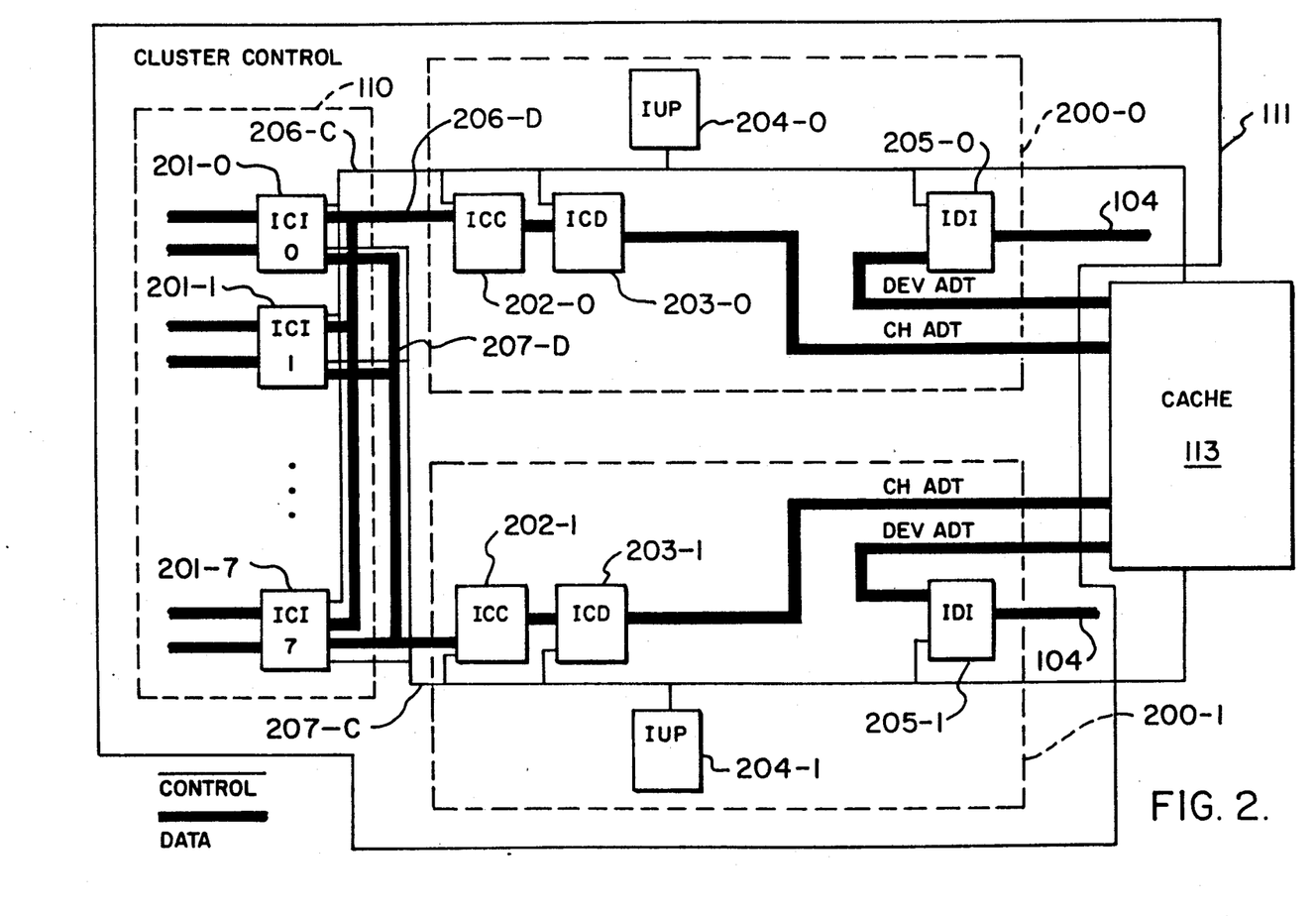
FIG. 2 illustrates additional details of the control unit in block diagram form.

FIG. 2 illustrates in block diagram form additional details of cluster control 111. Multipath storage director 110 includes a plurality of channel interface units 201-0 to 201-7, each of which terminates a corresponding pair of data channels 21, 31. The control and data signals received by the corresponding channel interface unit 201-0 are output on either of the corresponding control and data buses 206-C, 206-D, or 207-C, 207-D, respectively, to either storage path 200-0 or storage path 200-1. Thus, as can be seen from the structure of the cluster control 111 illustrated in FIG. 2, there is a significant amount of symmetry contained therein. Storage path 200-0 is identical to storage path 200-1 and only one of these is described herein. The multipath storage director 110 uses two sets of data and control busses 206-D, C and 207-D, C to interconnect each channel interface unit 201-0 to 201-7 with both storage path 200-0 and 200-1 so that the corresponding data channel 21 from the associated host processor 11 can be switched via either storage path 200-0 or 200-1 to the plurality of optical fiber backend channels 104. Within storage path 200-0 is contained a processor 204-0 that regulates the operation of storage path 200-0. In addition, an optical device interface 205-0 is provided to convert between the optical fiber signalling format of optical fiber backend channels 104 and the metallic conductors contained within storage path 200-0. Channel interface control 202-0 operates under control of processor 204-0 to control the flow of data to and from cache memory 113 and one of the channel interface units 201 that is presently active with storage path 200-0. The channel interface control 202-0 includes a cyclic redundancy check (CRC) generator/checker to generate and check the CRC bytes for the received data. The channel interface circuit 202-0 also includes a buffer that compensates for speed mismatch between the data transmission rate of the data channel 21 and the available data transfer capability of the cache memory 113. The data that is received by the channel interface control circuit 20-20 from a corresponding channel interface circuit 201 is forwarded to the cache memory 113 via channel data compression circuit 203-0. The channel data compression circuit 203-0 provides the necessary hardware and microcode to perform compression of the channel data for the control unit 101 on a data write from the host processor 11. It also performs the necessary decompression operation for control unit 101 on a data read operation by the host processor 11.

As can be seen from the architecture illustrated in FIG. 2, all data transfers between a host processor 11 and a redundancy group in the disk drive subsets 103 are routed through cache memory 113. Control of cache memory 113 is provided in control unit 101 by processor 204-0. The functions provided by processor 204-0 include initialization of the cache directory and other cache data structures, cache directory searching and management, cache space management, cache performance improvement algorithms as well as other cache control functions. In addition, processor 204-0 creates the redundancy groups from the disk drives in disk drive subsets 103 and maintains records of the status of those devices. Processor 204-0 also causes the redundancy data across the N data disks in a redundancy group to be generated within cache memory 113 and writes the M segments of redundancy data onto the M redundancy disks in the redundancy group. The functional software in processor 204-0 also manages the mappings from virtual to logical and from logical to physical devices. The tables that describe this mapping are updated, maintained, backed up and occasionally recovered by this functional software on processor 204-0. The free space collection function is also performed by processor 204-0 as well as management and scheduling of the optical fiber backend channels 104. Many of these above functions are well known in the data processing art and are not described in any detail herein.

Dynamic virtual Device to Logical Device Mapping

With respect to data transfer operations, all data transfers go through cache memory 113. Front end or channel transfer operations are completely independent of backend or device transfer operations. In this system, staging operations are similar to staging in other cached disk subsystems but destaging transfers are collected into groups for bulk transfers. In addition, this data storage subsystem 100 simultaneously performs free space collection, mapping table backup, and error recovery as background processes. Because of the complete front end/backend separation, the data storage subsystem 100 is liberated from the exacting processor timing dependencies of previous count key data disk subsystems. The subsystem is free to dedicate its processing resources to increasing performance through more intelligent scheduling and data transfer control.

The disk drive array data storage subsystem 100 consists of three abstract layers: virtual, logical and physical. The virtual layer functions as a conventional large form factor disk drive memory. The logical layer functions as an array of storage units that are grouped into a plurality of redundancy groups (ex 122-1 to 122-n+m), each containing N+M disk drives to store N physical tracks of data and M physical tracks of redundancy information for each logical track. The physical layer functions as a plurality of individual small form factor disk drives. The data storage management system operates to effectuate the mapping of data among these abstract layers and to control the allocation and management of the actual space on the physical devices. These data storage management functions are performed in a manner that renders the operation of the disk drive array data storage subsystem 100 transparent to the host processors (11-12).

Cache Architecture

Figure 3:
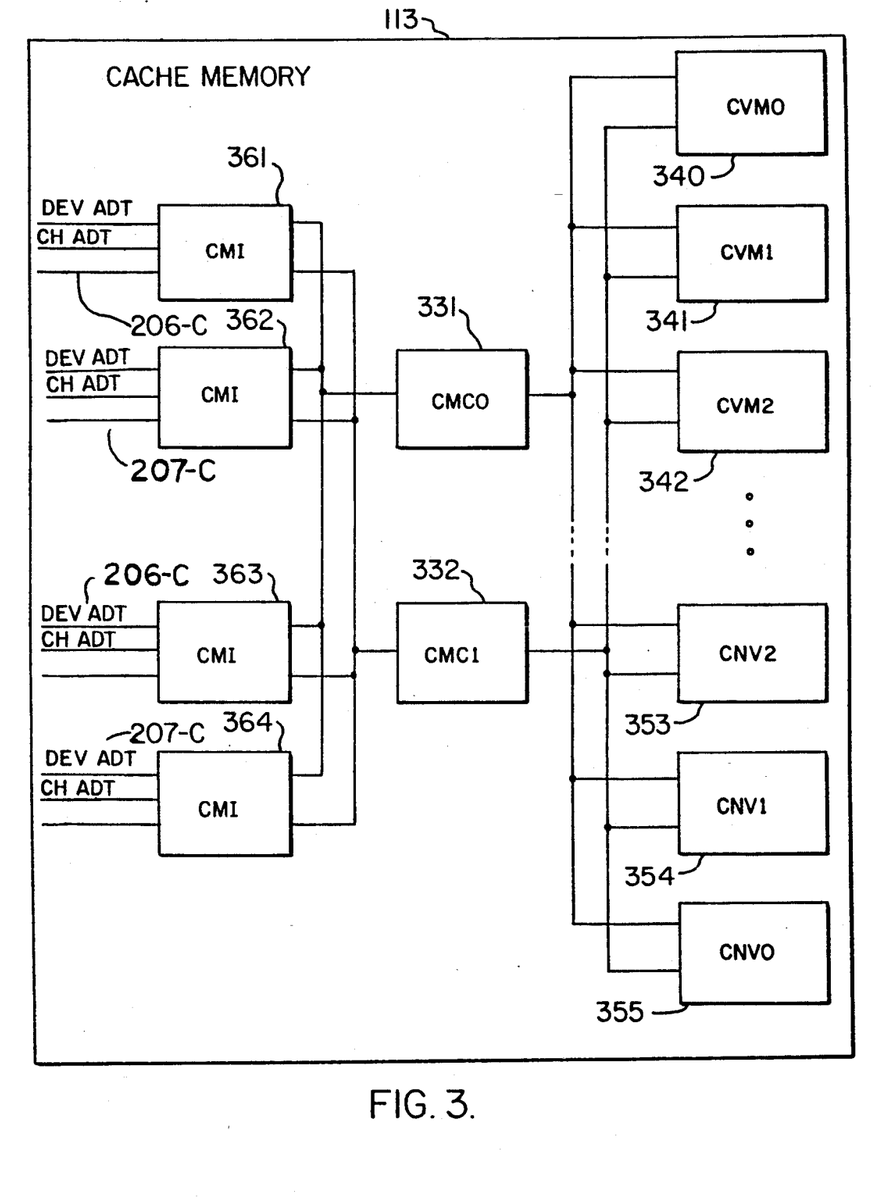
FIG. 3 illustrates, in block diagram form, the architecture of the cache memory which includes the redundancy accumulator.

FIG. 3 illustrates the overall architecture of cache memory 113 in block diagram form. A plurality of memory elements 340-355 provide the solid state memory of cache memory 113. These memory elements 340-355 can be circuit boards containing volatile or nonvolatile memory. The memory elements 340-355 are each connected to two cache memory controllers 331, 332 which function in well-known fashion to regulate the flow and placement of data to/from memory elements 340-355. The redundancy accumulator of the present invention is included in cache memory controllers 331, 322. A plurality of cache interfaces 361-364 are also provided in cache memory 113 to interconnect cache memory 113 with host processor 11 and the disk drive subsets 103 via cluster control 110 as described above.

Redundancy Accumulator

Figure 4:
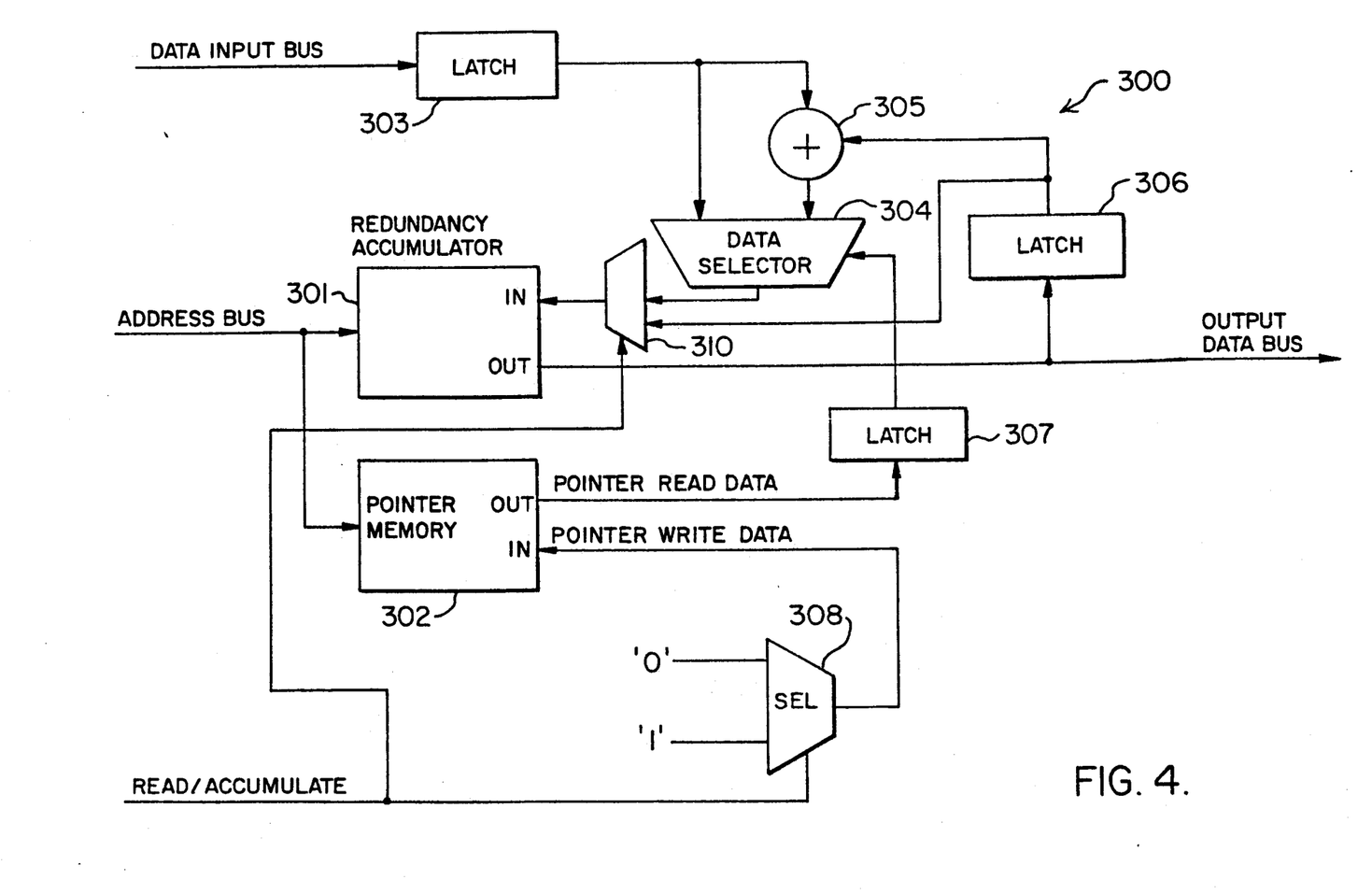
FIG. 4 illustrates, in block diagram form, the structure of the redundancy accumulator of the present invention.

The preferred embodiment of the redundancy accumulator of the present invention is disclosed in block diagram form in FIG. 4. This functional diagram illustrates the major components of the redundancy accumulator and, in particular, the reset apparatus that functions to erase the residue from the redundancy accumulator memory in an efficient manner.

As noted above, a disk array memory provides a high level of data integrity because the data is stored on a plurality of failure independent storage elements while a redundancy data is also stored in the redundancy group on another failure independent storage element. If a single storage element fails, the redundancy data plus the data from the remaining data storage elements can be used to recover the lost data. This redundancy can be a simple parity, an orthogonal parity, or a more complicated redundancy scheme such as a Reed-Solomon code. All of these redundancy schemes have a similar initialization requirement because all of these redundancy arrangements accumulate data over a number of data elements, such as records, sectors or tracks. Due to the large size of the data that is stored on each data storage element in a disk array, it is impractical to make the data from all of the data storage elements in a redundancy group available simultaneously to the redundancy calculation circuit. Instead, the data elements, such as physical tracks are moved one at a time to the redundancy generator 300 as they are sent via the optical file backend channels 104 to the data storage elements in a redundancy group. This requires the use of redundancy accumulator memory 301 which, is used to store the intermediate result of the redundancy calculations until all of the physical tracks have been included in the redundancy calculation. In order for this redundancy calculation to function properly, the redundancy accumulator memory 301 must be initialized between redundancy calculations. The redundancy accumulator memory 301 must be initialized to contain all zeros before the first physical track arrives at the redundancy generator circuit 300 in order to avoid an erroneous calculation being performed due to the input data being combined with stale data from previous redundancy calculations. This is a significant problem since the size of each physical track that is input to the redundancy generator 300 is not uniform. All of the memory locations in a redundancy accumulator memory 301 are not used for a particular redundancy calculation because a single memory IC is used for multiple redundancy accumulators. Without knowing which memory locations contain stale data, the redundancy accumulator memory 301 must be initialized to zero. A typical physical track size may be 64 K bytes or more and a simple resettable register is an impractical realization of the redundancy accumulator memory 301. A random access memory is typically used to realize redundancy accumulator memory 301. This memory can be reset to all zeros only by addressing each memory location therein and writing a zero into each memory location. This process takes a considerable amount of time and delays the writing of data to data storage subsystem 100.

Pointer Memory

The apparatus of FIG. 4 adds a pointer memory 302 to be connected to the address bus in parallel with the original redundancy accumulator memory 301. The pointer memory 302 stores data that indicative of the state of each memory location redundancy accumulator memory 301. Redundancy accumulator memory 301 is typically an n by k memory while pointer memory 302 is an n by 1 memory. There is a memory location in pointer memory 302 for each memory in redundancy accumulator memory 301. The bit in pointer memory 302 is set each time a byte in redundancy accumulator memory 301 is used to store a byte of a physical track as it is transferred from cache for storage in memory elements 340-355, a redundancy group via interfaces 361-364, or is used to store the product of a redundancy calculation based on transmitted physical tracks. If the bit in pointer memory 302 is not set, this indicates that the data stored in the corresponding byte location in redundancy accumulator memory 301 is stale, that is, it is representative of data left over from some previous redundancy calculation, not the present one. The redundancy accumulator memory 301 need never be initialized after the first read of the accumulator memory at power on reset time since pointer memory 302 contains a record of the currency of the data that is stored therein. Each time a new redundancy calculation is initiated, as each received physical track is written into redundancy accumulator memory 301, the status bit in pointer memory 302 is set to indicate that new data is written therein. Thus, for each successive product calculation for successive bytes of the physical track, the pointer memory 302 is used to determine whether the corresponding memory location in redundancy accumulator memory 301 has stored therein stale data or data from a previously received physical track or a previously computed redundancy product.

Redundancy Calculation

In operation, a byte from a received physical track is read into latch 303 and redundancy accumulator memory 301 is addressed by placement of a corresponding data address on address bus. The address of the address bus also concurrently addresses pointer memory 302. Control lead read/accumulate indicates the nature of the operation presently being performed, either a data read, where the redundancy product from redundancy accumulator memory 301 is output on the data bus, or an accumulation operation, wherein the received data on the data input bus is used to calculate redundancy information. In the case where data is read from redundancy accumulator memory 301, the status bit at the addressed memory location in pointer memory 302 is cleared by the application of a control signal on read-/accumulate lead which causes multiplexer 308 to output a binary zero to the input of pointer memory 302 thereby writing a clear data indication into pointer memory 302 to indicate that the data in redundancy accumulator memory 301 at the corresponding address has been output on the output bus and now becomes stale data. In the case where a redundancy calculation is being performed, multiplexer 308 outputs a one to write into the addressed memory location in pointer memory 302 to indicate the data relating the present redundancy calculation is being written into the corresponding memory location in redundancy accumulator memory 301. However, prior to this control bit being written into pointer memory 302 the present content of pointer memory 302 at the addressed location is output to latch 307 and is used to make the determination of the status of the data presently stored in the addressed memory location in redundancy accumulator memory 301.

This is accomplished by outputting the bit stored in pointer memory 302 via latch 307 to multiplexer 304. The inputs of multiplexer 304 are connected both to latch 303, which stores the new byte of the physical track presently received on the input bus and the output of redundancy calculator circuit 305. Redundancy calculator circuit 305 receives the data byte from latch 303 as well as the data presently stored in the addressed memory location of redundancy accumulator memory 301 as output via latch 306. In the case of a simple parity calculation, redundancy generator 305 simply combines the data received from latches 303 and 306 and outputs the resultant product to multiplexer 304. This redundancy generation takes place for every memory location in redundancy accumulator memory 301 whether or not it contains stale data.

The status of the addressed location in redundancy accumulator memory 301 is determined by latch 307, which activates multiplexer 304 to select either the data element stored in 303 and write that data directly into the addressed memory location in redundancy accumulator memory 301 via the input leads therein if the redundancy accumulator memory 301 contains stale data at this memory location as indicated by the status bit from pointer memory 302 as stored in latch 307. This is the same result as operating on the input data 303 with a '00' from the redundancy accumulator 301 had it been cleared to zeros by an explicit clear operation.

If stale data is not stored in the redundancy accumulator memory 301, the redundancy calculation is an accurate representation of the redundancy that is being generated and therefore the output of redundancy generator 305 is switched by multiplexer 304 to the input leads of redundancy accumulator memory 301 and stored in the addressed memory location therein. When valid prior data or prior redundancy products are stored in the addressed memory location of redundancy accumulator memory 301, these are used by redundancy generator 305 to combine with the received data byte from latch 303 in the present physical track to generate a new redundancy product which is written into redundancy accumulator memory 301 as part of the well known redundancy calculation. As each data byte is read from the presently received physical track and transmitted through latch 303 to redundancy generator 305 and multiplexer 304, this data is either directly written into the addressed memory location in redundancy accumulator memory 301 or used to perform a redundancy calculation with the prior product stored therein and this new product is then written into the addressed memory location. Once this determination is made and the data written into redundancy accumulator memory 301, the status bit in pointer memory 302 is updated as noted above by outputting the one bit from multiplexer 308 into the addressed memory location and pointer memory 302.

Redundancy Accumulator Memory Data Output

When data is output from redundancy accumulator memory 301 at the end of the redundancy calculation for data for the predetermined set of physical tracks written into the redundancy group, it is again critical to note and update the status of each memory location in redundancy accumulator memory 301 by writing a '0', as output by multiplexer 308, into pointer memory 302. The read/accumulate bit is off when the redundancy product is being transferred to the redundancy group.

Once the data is read onto the output bus, the control signal on read/accumulate lead causes multiplexer 308 to output a zero into the addressed memory location in pointer memory 302 to reset the bit stored therein to indicate that the data from the corresponding memory location in redundancy accumulator memory 301 has been output and the contents of that memory location now represent stale data from a previous redundancy calculation. Thus, redundancy accumulator memory 301 is never cleared but its status is simply updated during the output process. When the entire contents of redundancy accumulator memory 301 are output via output bus to the redundance disk drives in the redundancy array, the next set of physical tracks can begin transferring to the disk array 103 and a new redundancy calculation initiated as noted above without re-initializing redundancy accumulator memory 301 since the status bits in pointer memory 302 have been all reset to zero and now represent the true status of all of the memory locations in redundancy accumulator memory 301, that is all the data contained therein is stale from a previous redundancy calculation.

There is no delay between reading the redundancy product out of redundancy accumulator memory 301 into the corresponding redundancy disk drives and the initiation of a new redundancy calculation for the subsequently received predetermined set of physical tracks to be stored on the redundancy group. In this manner, the operation of the redundancy group is timewise efficient in that data records can be continuously received from the associated computer system without necessitating a delay caused by the need to re-initialize the redundancy accumulator memory 301 between redundancy calculations.

An additional feature of this apparatus in the feedback multiplexer 310. A typical implementation of redundancy accumulator memory 301 is the use of a read/modify/write memory device. In order to prevent the output of multiplexer 304 from being written into redundancy accumulator memory 301 during a data read, multiplexer 310 blocks the output of multiplexer 304 and instead feeds back the output cata via latch 306 during a data read. The use of multiplexer 310 also enables the system to retry in the case of a data transmission error during the writing of the redundancy calculation to the redundancy group. Redundancy accumulator memory 301 still contains valid redundancy data and can be reread since multiplexer 310 maintains valid data therein.

While a specific embodiment of this invention has been disclosed, it is expected that those skilled in the art can and will design alternate embodiments of this invention that fall within the scope of the appended claims.

I claim:

1. Apparatus, having an input and an output, for producing a set of redundancy data in response to a predetermined number of data records, in a stream of data records from a processor, received at said input, comprising:

redundancy accumulator memory means, having address, input and output leads and a plurality of memory locations therein, for storing data;

redundancy operator means, connected to said output leads of said redundancy accumulator memory means, for calculating a redundancy product using both an addressed data element of a data record presently extant on said apparatus input and a redundancy product calculated from said predetermined number of data records and previously stored in said redundancy accumulator memory means at a memory location determined by a selected address applied to said address leads of said redundancy accumulator memory means;

means, connected to and interconnecting said redundancy generator means and said redundancy accumulator memory means, for writing said calculated redundancy product in said redundancy accumulator memory means at said addressed memory location;

means for identifying whether data representative of said redundancy product is stored in each memory location in said redundancy accumulator memory means.

2. The apparatus of claim 1 further comprising:
means, responsive to said writing means inputting said redundancy product produced from the last data record of said predetermined set of data records into said redundancy accumulator memory means, for transmitting said last data record redundancy product to said redundancy generator apparatus output.

3. The apparatus of claim 1 wherein said identifying means comprises a memory having address, input and output leads and a plurality of memory locations therein, each said memory location for storing data representative of the presence of said redundancy product in a corresponding memory location in said redundancy accumulator memory means, said apparatus further comprises:

means, responsive to said selected address applied to both said redundancy accumulator memory means address leads and said identifying means address leads, for applying said addressed data element to said input leads of said redundancy accumulator memory means when the memory location in said identifying means addressed by said applied address indicates that said previously generated redundancy product from said predetermined set of data records is not stored in said corresponding memory location in said redundancy accumulator memory means.

4. The apparatus of claim 3 wherein said apparatus further comprises:
means, responsive to said selected address applied to both said redundancy accumulator memory means address leads and said identifying means address leads, for applying said calculated redundancy product to said input leads of said redundancy accumulator memory means when the memory location in said identifying means addressed by said applied address indicates that said previously generated redundancy product from said predetermined set of data records is stored in said corresponding memory location in said redundancy accumulator memory means.

5. The apparatus of claim 3 wherein said apparatus further comprises:
means, responsive to said addressed data element written into said redundancy accumulator memory means, for writing data, representative of said redundancy product being stored in said corresponding memory location in said redundancy accumulator memory, into the memory location in said identifying means addressed by said selected address.

6. The apparatus of claim 1 wherein said identifying means comprises a memory having address, input and output leads and a plurality of memory locations therein, each said memory location for storing data representative of the presence of said redundancy product in a corresponding memory location in said redundancy accumulator memory means, said apparatus further comprises:

means, responsive to said selected address applied to both said redundancy accumulator memory means address leads and said identifying means address leads, for applying the contents of said addressed memory location of said redundancy accumulator memory means to said redundancy generator apparatus output leads and to said redundancy accumulator memory means input leads when the memory location in said identifying means addressed by said applied address indicates that said previously generated redundancy product from said predetermined set of data records is stored in said corresponding memory location in said redundancy accumulator memory means.

7. The apparatus of claim 1 wherein said redundancy generator means comprises:
parity generator means responsive to the receipt of said predetermined set of data records for calculating a parity record indicative of the parity of each addressable data element in said predetermined set of data records.

8. The apparatus of claim 1 wherein said redundancy generator means comprises:
redundancy code generator means responsive to the receipt of said predetermined set of data records for calculating a redundancy code record comprising the result of the application of a predetermined data redundancy algorithm to each addressable data element in said predetermined set of data records.

9. Apparatus, having an input and an output, for producing a set of redundancy data in response to a predetermined number of data records, in a stream of data records from a processor, received at said input, comprising:

redundancy accumulator memory means, having address, input and output leads and a plurality of memory locations therein, for storing data;

redundancy generator means, connected to said output leads of said redundancy accumulator memory means, for calculating a redundancy product using both an addressed data element of a data record presently extant on said apparatus input and a redundancy product calculated from said predetermined number of data records and previously stored in said redundancy accumulator memory means at a memory location determined by a selected address applied to said address leads of said redundancy accumulator memory means;

means, connected to and interconnecting said redundancy generator means and said redundancy accumulator memory means, for writing said calculated redundancy product in said redundancy accumulator memory means at said addressed memory location;

means for identifying whether data representative of said redundancy product is stored in each memory location in said redundancy accumulator memory means, comprising:

a memory having address, input and output leads and a plurality of memory locations therein, each said memory location for storing data representative of the presence of said redundancy product in a corresponding memory location in said redundancy accumulator memory means;

means, responsive to said addressed data element written into said redundancy accumulator memory means, for writing data, representative of said redundancy product being stored in said corresponding memory location in said redundancy accumulator memory, into the memory location in said identifying means addressed by said selected address;

means, responsive to said selected address applied to both said redundancy accumulator memory means address leads and said identifying means address leads, for applying said addressed data element to said input leads of said redundancy accumulator memory means when the memory location in said identifying means addressed by said applied address indicates that said previously generated redundancy product from said predetermined set of data records is not stored in said corresponding memory location in said redundancy accumulator memory means;

means, responsive to said selected address applied to both said redundancy accumulator memory means address leads and said identifying means address leads, for applying said calculated redundancy product to said input leads of said redundancy accumulator memory means when the memory location in said identifying means addressed by said applied address indicates that said previously generated redundancy product from said predetermined set of data records is stored in said corresponding memory location in said redundancy accumulator memory means;

means, responsive to said selected address applied to both said redundancy accumulator memory means address leads and said identifying means address leads, for applying the contents of said addressed memory location of said redundancy accumulator memory means to said redundancy generator apparatus output leads and to said redundancy accumulator memory means input leads when the memory location in said identifying means addressed by said applied address indicates that said previously generated redundancy product from said predetermined set of data records is stored in said corresponding memory location in said redundancy accumulator memory means.

10. Apparatus, having an input and an output, for producing a set of redundancy data in response to a predetermined number of data records, in a stream of data records from a processor, received at said input, comprising:

redundancy accumulator memory means, having address, input and output leads and a plurality of memory locations therein, for storing data;

redundancy generator means, connected to said output leads of said redundancy accumulator memory means, for calculating a redundancy product using both an addressed data element of a data record presently extant on said apparatus input and a redundancy product calculated from said predetermined number of data records and previously stored in said redundancy accumulator memory means at a memory location determined by a selected address applied to said address leads on said redundancy accumulator memory means;

means, connected to and interconnecting said redundancy generator means and said redundancy accumulator memory means, for writing said calculated redundancy product in said redundancy accumulator memory means at said addressed memory location;

identifying memory means having address, input and output leads and a plurality of memory locations therein, each said memory location for storing data representative of whether said redundancy product is stored in a corresponding memory location in said redundancy accumulator memory means;

means, responsive to said selected address applied to both said redundancy accumulator memory means address leads and said identifying memory means address leads, for applying said addressed data element to said input leads of said redundancy accumulator memory means when the memory location in said identifying memory means addressed by said applied address indicates that said previously generated redundancy product from said predetermined set of data records is not stored in said corresponding memory location in said redundancy accumulator memory means;

means, responsive to said selected address applied to both said redundancy accumulator memory means address leads and said identifying memory means address leads, for applying said calculated redundancy product to said input leads of said redundancy accumulator memory means when the memory location in said identifying memory means addressed by said applied address indicates that said previously generated redundancy product from said predetermined set of data records is stored in said corresponding memory location in said redundancy accumulator memory means.

11. The apparatus of claim 10 further comprising:

means, responsive to said writing means inputting said redundancy product produced from the last data record of said predetermined set of data records into said redundancy accumulator memory means, for transmitting said last data record redundancy product to said redundancy generator apparatus output.

12. The apparatus of claim 10 wherein said apparatus further comprises:

means, responsive to said addressed data element written into said redundancy accumulator memory means, for writing data, representative of said redundancy product being stored in said corresponding memory location in said redundancy accumulator memory, into the memory location in said identifying memory means addressed by said selected address.

13. The apparatus of claim 10 further comprising:

means, responsive to said selected address applied to both said redundancy accumulator memory means address leads and said identifying memory means address leads, for applying the contents of said addressed memory location of said redundancy accumulator memory means to said redundancy generator apparatus output leads when the memory location in said identifying memory means addressed by said applied address indicates that said previously generated redundancy product from said, predetermined set of data records is stored in said corresponding memory location in said redundancy accumulator memory means.

14. The apparatus of claim 13 wherein said apparatus further comprises:

means, responsive to said selected address applied to both said redundancy accumulator memory means address leads and said identifying memory means address leads, for transmitting the contents of said addressed memory location of said redundancy accumulator memory means to said redundancy accumulator memory means input leads when the memory location in said identifying memory means addressed by said applied address indicates that said previously generated redundancy product from said predetermined set of data records is stored in said corresponding memory location in said redundancy accumulator memory means.

15. The apparatus of claim 10 wherein said redundancy generator means comprises:

parity generator means responsive to the receipt of said predetermined set of data records for calculating a parity record indicative of the parity of each addressable data element in said predetermined set of data records.

16. The apparatus of claim 10 wherein said redundancy generator means comprises:

redundancy code generator means responsive to the receipt of said predetermined set of data records for calculating a redundancy code record comprising the result of the application of a predetermined data redundancy algorithm to each addressable data element in said predetermined set of data records.

* * * * *